July 14, 1970 A. ADDAMIANO 3,520,740

METHOD OF EPITAXIAL GROWTH OF ALPHA SILICON CARBIDE BY PYROLYTIC DECOMPOSITION OF A MIXTURE OF SILANE, PROPANE AND HYDROGEN AT ATMOSPHERIC PRESSURE

Filed May 18, 1967

Inventor:
Arrigo Addamiano
by [signature]
His Attorney

United States Patent Office 3,520,740

Patented July 14, 1970

3,520,740

METHOD OF EPITAXIAL GROWTH OF ALPHA SILICON CARBIDE BY PYROLYTIC DECOMPOSITION OF A MIXTURE OF SILANE, PROPANE AND HYDROGEN AT ATMOSPHERIC PRESSURE

Arrigo Addamiano, Willoughby, Ohio, assignor to General Electric Company, a corporation of New York Filed May 18, 1967, Ser. No. 639,361
Int. Cl. H01l 7/36
U.S. Cl. 148—175 4 Claims

ABSTRACT OF THE DISCLOSURE

Epitaxial growth of αSiC (hexagonal) on αSiC single crystals (plates) has been achieved by flowing a mixture of $SiH_4$, $C_3H_8$ and $H_2$ through a bell jar at atmospheric pressure. The SiC single crystal substrates are placed on a resistance heater of spectrographic grade graphite and good epitaxial growth is obtained in the range from 1700 to 1850° C. Doping of the grown layers may be accomplished by adding suitable dopants to the gas stream such as diborane $B_2H_6$ for p-type doping, or phosphine $PH_3$ for n-type doping.

Figure 1:
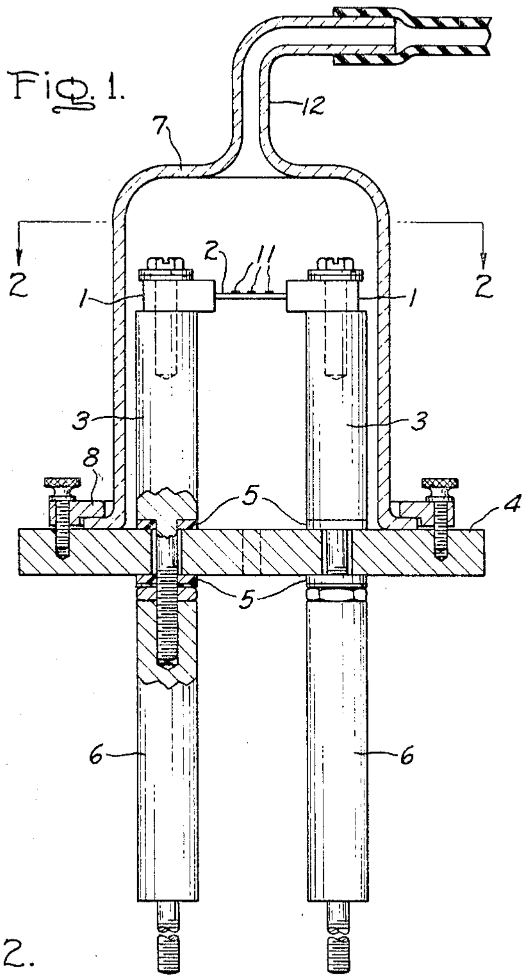

This invention relates to the preparation of silicon carbide crystals having sharply defined regions of different conductivity.

An outstanding characteristic of silicon carbide as a semiconductor is its retention of extrinsic semiconductivity to temperatures as high as 700° C. This means that SiC semiconductive devices can be used at much higher temperatures than germanium or silicon semiconductors which become intrinsically conductive at temperatures in excess of 150° C. and 250° C. respectively. Another characteristic of SiC is the comparatively large gap between the valence band and the conduction band. This permits the production of light by injection electroluminescence wherein the recombination of holes and electrons at a p-n junction is associated with emission of photons. Such devices have become known as solid state lamps or luminous diodes.

Silicon carbide may be made p-type by doping it with an acceptor impurity such as aluminum or boron, or n-type by doping it with a donor impurity such as nitrogen or phosphorus. Doping may be done during the growth of the SiC crystals, for instance by flowing a carrier gas containing the appropriate impurity through the reaction zone of the growth furnace. However such a method of preparation does not result in a sharply defined boundary or transition zone from one type of conductivity to the other. A sharply defined transition zone is very desirable whether the material is to be used as semiconductor device or as a solid state lamp.

Silicon carbide exists in a number of hexagonal and rhombohedral "high temperature" forms, designated αSiC; the most common is the hexagonal six-layer structure usually referred to as 6HSiC. The band gap of 6HSiC is about 3.0 ev. at room temperature and it is the most important form for light production. The cubic "low temperature" form, designated βSiC, has a band gap of about 2.3 ev.

The desirability of sharply defined conductivity zones in SiC has provoked studies of epitaxial growth, that is, growth of layers isostructural and iso-oriented with selected substrate crystals. Most of the interest has focused on the growth of thin layers of high temperature, high band gap forms of SiC (e.g. 6H; 15R; 4H; etc.) on seeds of such high temperature forms of SiC, for instance thin layers of hexagonal 6HSiC on hexagonal 6HSiC single crystals. What has been reported to date in the published literature are variations of two methods. One which I shall term the "chemical reduction method" involves reaction of carbon tetrachloride $CCl_4$ and silicon tetrachloride $SiCl_4$ in a stream of hydrogen $H_2$ on a seed of αSiC (usually 6HSiC) at a temperature of 1700 to 1800° C. and at atmospheric pressure. The other which I shall term the "reduced pressure method" involves the reaction of silane $SiH_4$ with propane $C_3H_8$ at a low pressure ($10^{-2}$ torr) in a ratio of about 1.2:1 and without hydrogen or other carrier gas.

In the chemical reduction method, induction heating rather than conventional resistance heating is used in order to insure longer life of the heating elements which are attached by the hydrochloric acid formed by the reacting gases. It has been proposed to prevent the chemical attack by coating the graphite resistance element with tantalum silicide. Where the highest degree of purity is desired in a system involving Si and C, graphite as a heating element is much to be preferred. According to Spielmann (Z. angew. Phys. 18, 323 (1965)) the chemical reduction method has different limitations which make it impossible to grow layers thicker than about 30 microns.

In the reduced pressure method, induction heating has also been used to insure longer life of the heating element under quasi vacuum conditions. A serious disadvantage of this method is that precise control of the low pressure is required to assure epitaxial growth. The use of a quasi vacuum system is inconvenient and the occurrence of leaks can result in experimental difficulties.

The objects of the invention are to provide a more convenient method of growing epitaxial layers on α silicon carbide; obtaining thereby better quality SiC both in undoped and doped state; achieving better control of the crystal structure of the layers; obtaining sharply defined regions of differtnt conductivity types; and preparing p-n junctions of more desirable profiles.

I have found that it is possible to grow good quality epitaxial layers of αSiC on αSiC seeds using a conventional graphite resistance heating system and a suitable mixture of $SiH_4$,$C_3H_8$ and $H_2$ at atmospheric pressure. The simple heating system and the atmospheric pressure reaction permit the use of an inexpensive bell jar arrangement. Good epitaxial layer growth is obtained in the temperature range from 1700 to 1850° C. Pressure may also exceed atmospheric.

Figure 2:
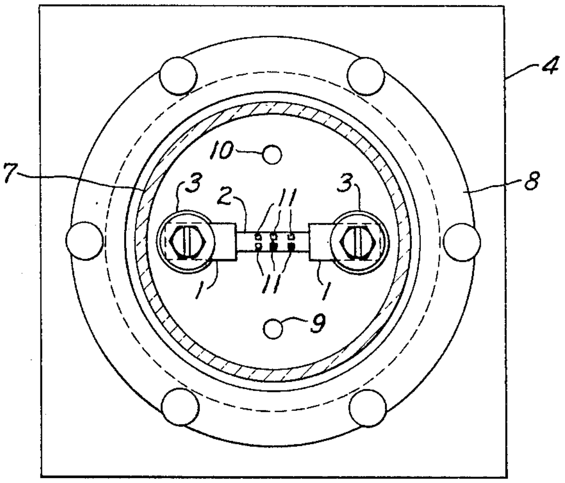

The invention will be described in greater detail with reference to the drawing in which FIG. 1 illustrates schematically an apparatus for epitaxial growth of α silicon carbide in accord with the present invention, and FIG. 2, is a plan view of the same apparatus.

Referring to the drawing, a resistance heating element consisting of spectrographic grade graphite has relatively large cross section ends 1 and a reduced section central portion 2. The ends are clamped to heavy cylindrical copper electrodes 3 having threaded studs projecting down through oversize holes in base plate 4. Hermetic sealing washers 5 of a material capable of withstanding the temperature of the electrodes, suitably of fluorocarbon (Teflon), are provided where the electrodes seat on the base plate. Projecting portions 6 threaded on the studs below the base plate permit dissipation of excess heat to the atmosphere. Circuit connections are made to the portions 6, suitably from the secondary of a step-down transformer. A bell jar 7 seats on the base plate and is fastened down by a clamping ring 8. The bell jar is connected through aperture 9 in the base plate to a manifold for exhausting prior to growing operations. Hydrogen and the reacting gases are introduced into the bell jar through top connection 12 in the bell jar and the excess is vented out through aperture 10 in the base plate. This arrangement assures that the crystals 11 on the heating element face the gas flow. The crystal seeds which may consist of several small square plates cut from a 6H-SiC plate must be perfectly polished. I have found that best results are obtained by using first conventional polishing with fine diamond powder and thereafter removing the surface damage due to diamond polishing by a final polishing with extra fine gamma-alumina powder, suitably using $Al_2O_3$ of 0.05 micron particle size for one to two hours. The polished crystals 11 and then ultrasonically cleaned and placed on the central portion 2 of the graphite heater.

For good epitaxial growth, temperature and concentrations of reactants, as well as their flow, should be optimized. I have found that at temperatues from 1100° C. to about 1500° C. only polycrystalline layers of $\beta$-SiC of poor crystal quality are obtained. Above 1500° C. and up to about 1650° C. better crystal quality is obtained, but the product still consists of $\beta$-SiC as revealed by X-ray diffraction. Only in the temperature range from 1700° to 1850° C. is good epitaxial growth obtained. Above 1900° C. dissociation or etching of the crystals took place.

Good quality growth was observed with a hydrogen to propane ($H_2$:$C_3H_8$) volume ratio of about 500:1, and a propane to silane ($C_3H_8$:$SiH_4$) volume ratio of about 1.5:1. For instance a suitable rate consisted of 5 liters per minute $H_2$, plus 10 milliliters per minute $C_3H_8$, and 6.5 milliliters per minute $SiH_4$. A flow rate of 2.5 liters per minute $H_2$, 5 milliliters per minute $C_3H_8$ and about 3.5 milliliters per minute $SiH_4$ also gave good results. Increasing the flow rates usually results in faster growth rates accompanied by a decrease in the quality of the grown layers. For instance with the first of the preceding flow rates at 1700° to 1800°, the crystal growth rates were approximately 0.6 to 0.7 micron per minute. When the flow rates were cut by a factor of 2 to the second series of figures set out above, the growth rates decreased to about 0.5 or less microns per minute and the grown layer was more uniform.

The preferred full cycle of operations for epitaxial growth according to my method involves the following steps:

(1) Polishing the crystal plates, first with diamond powders, then the gamma-alumina powder followed by ultrasonic cleaning of the polished surfaces.

(2) Setting the crystals on the heating element.

(3) Purging the apparatus by exhausting the bell jar to the micron range, and repeatedly filling with an inert gas such as argon, helium, etc. or hydrogen, followed by pumping off.

(4) A slow flow of hydrogen, suitably 1 liter or so per minute, is established through the bell jar and the temperature is slowly raised to the desired level, suitably 1750° C.; this is done slowly to avoid disturbing and displacing the crystals.

(5) The selected mixture of hydrogen, propane and silane is allowed to flow through the bell jar at atmospheric pressure and react.

(6) After the desired growth has occurred, power is shut off, the system is allowed to cool, and the crystals are recovered.

Besides the advantages of low cost and simplicity of operation, my method leads to high purity materials. Neither the heating element nor the reacting chemicals introduce any atomic species into the reaction zone except C, Si and $H_2$. C and Si are the constituent elements of silicon carbide and pose no problem while $H_2$ serves only as a carrier. If doping of the growing layer is desired, this may be accomplished by adding suitable dopants to the gas stream, for instance a trace of diborane $B_2H_6$ for p-type doping, or phosphine $PH_3$ for n-type doping. These gases as well as others which may be used for the desired doping are commercially available in the pure state or can be obtained as mixtures with other gases such as hydrogen, argon, helium etc. Silane, propane and hydrogen of "research" and "semi-conductor" grade can similarly be obtained from the shelf.

My method also has the advantage of considerable savings in equipment cost. I have found a bell jar of approximately 4" outer diameter suitable; it has a large surface by comparison with the 1" inner diameter double-walled water-cooled quartz jacket used by others in epitaxial crystal growing. As a consequence no water cooling of the bell jar is required and Pyrex as well as quartz can be used. Water cooled electrodes are convenient but not necessary. In view of the low power input needed to establish the reaction temperatures, the electrodes can be adequately cooled merely by their expanded lower portions outside the bell jar which serve as effective heat sinks. Ventilation of the lower portions assures adequate dissipation of the heat produced. It is advisable to water cool the metal base plate of the system through which the electrodes pass to insure that the electrically insulating discs or seals 6 do not overheat and start leaking.

I found that the quality of layers grown on well prepared seed crystals of silicon carbide is satisfactory for most applications. Back reflection X-ray photographs of the grown layers taken with soft X-rays show the same patterns as the substrate crystals and no evidence of diffuse reflections.

What I claim as new and desire to secure by Letters Patent of the United States is:

1. The method of growing epitaxial layers of $\alpha$SiC on $\alpha$SiC seed crystals which comprises polishing the seed crystal surfaces, placing the crystals on a graphite resistance heating element, raising the temperature of the heating element to the range of 1700 to 1850° C., and flowing a mixture of $H_2$, $C_3H_8$ and $SiH_4$ at pressure which is at least atmospheric about the crystals.

2. The method of claim 1 wherein the ratio of $H_2$ to $C_3H_8$ is about 500 to 1 and the ratio of $C_3H_8$ to $SiH_4$ is about 1.5:1.

3. The method of claim 1 with a trace of diborane $B_2H_6$ included in the gas mixture.

4. The method of claim 1 with a trace of phosphine $PH_3$ included in the gas mixture.

References Cited

UNITED STATES PATENTS

| | | | |
|---|---|---|---|
| 3,157,541 | 11/1964 | Heywang et al. | 148—174 |
| 3,228,756 | 1/1966 | Hergenrother. | |
| 3,382,113 | 5/1968 | Ebert et al. | 148—175 |
| 3,386,866 | 6/1968 | Ebert et al. | 148—175 |

FOREIGN PATENTS

| | | |
|---|---|---|
| 1,031,783 | 11/1963 | Great Britain. |

OTHER REFERENCES

W. F. Knippenberg, Philips Res. Repts. 18, 161–274, 1963.

L. DEWAYNE RUTLEDGE, Primary Examiner

W. G. SABA, Assistant Examiner

U.S. Cl. X.R.

23—208; 117—106, 201; 252—62.3